May 13, 1952 G. CHAUSSON 2,596,209
VARIABLE FLEXIBILITY SUSPENSION DEVICE FOR VEHICLES
Filed Dec. 3, 1945 2 SHEETS—SHEET 1

INVENTOR
Gaston Chausson
BY
Richard Geier
ATTORNEYS

May 13, 1952 G. CHAUSSON 2,596,209
VARIABLE FLEXIBILITY SUSPENSION DEVICE FOR VEHICLES
Filed Dec. 3, 1945 2 SHEETS—SHEET 2

INVENTOR
Gaston Chausson
BY
Richard y Geier
ATTORNEYS

Patented May 13, 1952

2,596,209

UNITED STATES PATENT OFFICE 2,596,209

VARIABLE FLEXIBILITY SUSPENSION DEVICE FOR VEHICLES

Gaston Chausson, Asnieres, France, assignor to Societe Anonyme Des Usines Chausson, Asnieres, France, a company of France Application December 3, 1945, Serial No. 632,489
In France July 9, 1943

Section 1, Public Law 690, August 8, 1946
Patent expires July 9, 1963

1 Claim. (Cl. 267—20)

This invention relates to suspension devices of variable flexibility for suspended members of vehicles.

Up to the present, a number of suspension devices for the suspended members of vehicles, and especially light vehicles, have been used which employ compression springs slipped over tubes or rods serving at the same time to guide the movements of the suspended member. Counter springs intended to limit the oscillations were often added. However, devices of this kind have been found to be chiefly useful for well defined loads and limited oscillations.

The object of this invention is to provide a suspension device of variable flexibility having self-braking of the oscillations.

A further object is the provision of a suspension device of variable flexibility that may be used with any wheel of a vehicle.

Still another object is to provide a suspension device of variable flexibility that may be used with any mechanical control or braking device.

In the accomplishment of these objectives, a suspension spring of great flexibility is arranged with auxiliary springs in such a manner that when there is an increase in the load the auxiliary springs dampen the oscillations and increase the dampening effect with the increase in the amplitude of the oscillations.

The invention will appear more clearly from the following detailed description when taken in connection with the accompanying drawings showing by way of example a preferred embodiment of the inventive idea.

Figure 1:
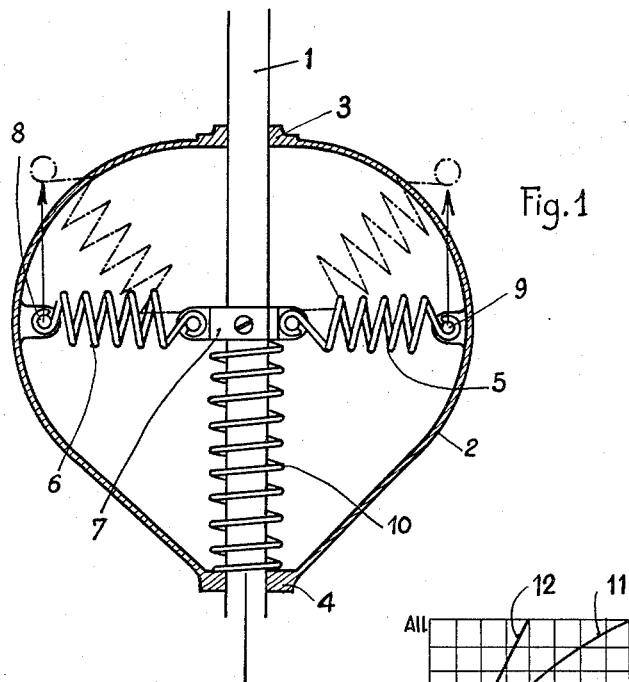
Figure 1 is an elevational view of the variable flexibility suspension device for vehicles with a portion of the housing removed and constructed in accordance with the principles of this invention.

Referring now in greater detail to the embodiment of the suspension device shown in Figure 1, reference numeral 2 indicates the housing, 1 the guide, 10 the suspension spring and 5 and 6 the auxiliary springs.

The housing 2 is affixed to the support of a wheel of the vehicle by any suitable means. The guide 1 is slidably inserted in the housing 2 through the aligned apertures 3 and 4 in the top and bottom of the housing with one end affixed by any suitable means to the body of the vehicle. Within the housing 2 are the suspension spring 10 and the auxiliary springs 5 and 6 on either side of the guide and in a substantially vertical plane. The auxiliary springs 5 and 6 are attached to the guide 1 by the collar 7 which is designed to be longitudinally adjustable along the guide 1 by means of a set screw, and are pivotally mounted at the points 8 and 9 on the inside of the housing by any mechanical means as shown in Figure 1. Between the end 4 of the housing 2 and the collar 7 is the suspension spring 10. The spring 10 is designed to balance a force of a given magnitude while the auxiliary springs 5 and 6 are attached under tension but have no substantial effect in the original position of attachment.

Figure 2:
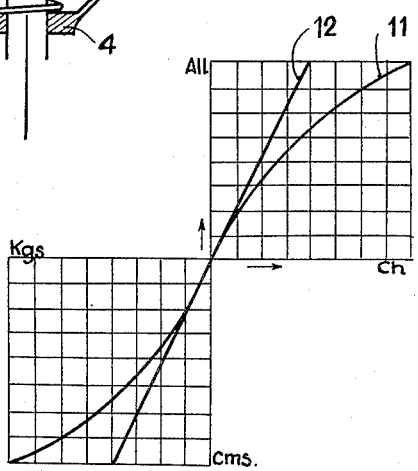
Figure 2 is a graphical representation of the effect of a suspension spring with and without auxiliary springs.

The operation is as follows:

When the vehicle passes over an obstacle, the wheel and housing 2 attached to the wheel support is forced upwardly which compresses the spring 10 and forces the pivotally mounted ends of the auxiliary springs 5 and 6 upwardly to the dotted positions shown in Figure 1, the lengths of the auxiliary springs 5 and 6 being progressively stretched to the new position. In Figure 2, the curve of flexibility of suspension using the suspension spring 10 exclusively has been plotted and found to follow the linear equation represented by the straight line 12 whereas with the addition of the auxiliary springs 5 and 6 the curve 11 was obtained showing the progressively stiffening effect of the device with an increase in the amplitude of the oscillations.

Figure 3:
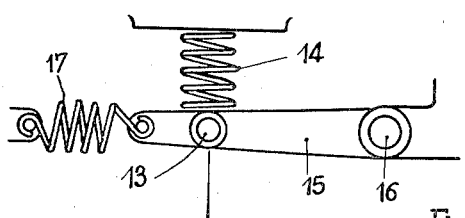
Figure 3 is an elevational view of another embodiment of the variable flexibility suspension device shown in Figure 1.

In the embodiment shown in Figure 3, a wheel (not shown) of a vehicle is rotatably fixed at position 13 to a lever 15. One end of the lever 15 is pivotally secured to one portion of the body by any suitable means 16. The free end of the lever 15 is secured to a second portion of the body by any suitable auxiliary spring tensions means 17 in such a manner that in the normal position of the wheel, the lever 15 will be substantially horizontal. A second spring 14 is inserted intermediate the lever 15 at a point adjacent the wheel and a third portion of the body. In the normal horizontal position of the lever 15, the second spring 14 is substantially perpendicular to the center line of the lever.

Figure 4:
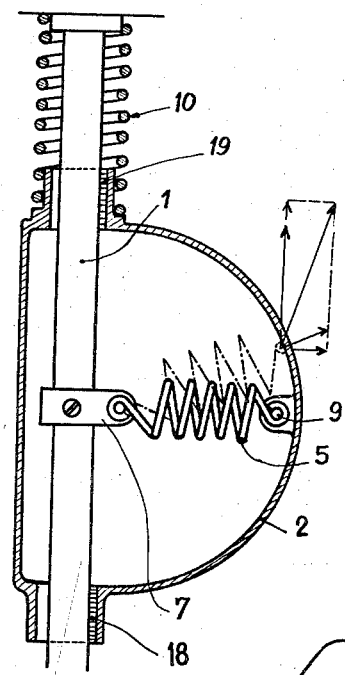
Figure 4 is an elevational view of still another embodiment of the variable flexibility suspension device shown in Figure 1 and having in addition friction braking means.

In the embodiment shown in Figure 4, the fact that the auxiliary springs constantly apply a transverse force relative to the guide 1 (Fig. 1) has been utilized to obtain a further dampening by friction. Here, suspension spring 10 is shown mounted outside of the housing 2 with only one auxiliary spring 5 attached to the guide 1 by the collar 7 and to the inside of the housing by any pivotal mounting means 9. The housing 2 is slidable on the guide 1 against the action of the suspension spring 10 through the bushings 18 and 19. By forming the bushings 18 and 19 of material having a high frictional factor, the pressure of the guide 1 against the friction bushings provides an additional dampening affect on the amplitude of the oscillations above that previously described.

Figure 5:
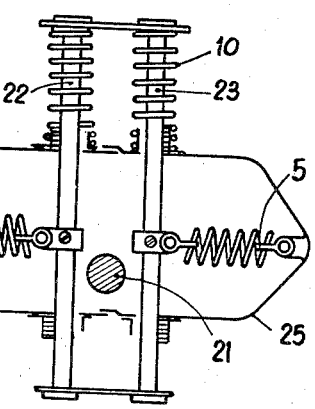
Figure 5 is a front elevational view of a further embodiment of the variable flexibility suspension device shown in Figure 1 in which two suspension springs and guides are used.
Figure 6:
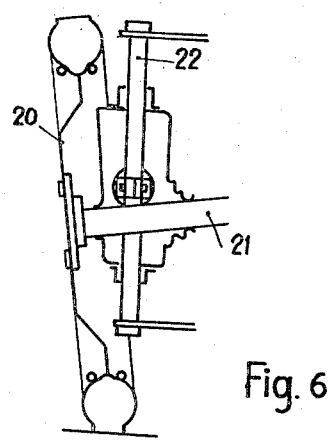
Figure 6 is an end elevational view of the variable flexibility suspension device shown in Figure 5.

In the embodiment shown in Figures 5 and 6 is the wheel 20 which may be a steering or a fixed wheel secured to one end of an axle 21. Around the axle 21 is a housing composed of the two halves 24 and 25 (Fig. 5). Two guides 22 and 23, connected to the vehicle body at the top are slidably passed through aligned apertures in the top and bottom surface portions of the housing with one guide on either side of the axle 21 and secured at the top and bottom by cross tie rods which may have a back lash to enable movement one from the other to a limited extent. Of course, this movement could be accomplished with button holes provided in the cross tie rods. The two suspension springs 10 between the housing and the top cross tie rod absorb the shocks. The auxiliary springs 5 and 6 are secured at one end to the inside surface portion of the housing and are attached to the guides 22 and 23 by collars as shown in Figure 5. In the aligned openings in the top and bottom surface portions of the housing for the guides 22 and 23 are bushings formed of material having a high frictional factor as in the embodiment shown in Figure 4. Under compression of a force above the designed force, the suspension springs 10 are compressed by the housing, which stretches the auxiliary springs 5 and 6, exerting a progressively increasing force on the guide rods 22 and 23 which together with the action of the friction bushings dampens the amplitude of the oscillations substantially along the line of the curve 11 shown in Figure 2.

Of course, the housing shown in the Figures 5 and 6 could be in the form of a single unit rather than in two pieces, and the frictional force between the guides and the housing could be provided by various mechanical means. The number of auxiliary springs may be as desired and may be arranged radially in a single plane or grouped in pairs.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

I claim:

A suspension device of variable flexibility for a wheel of a vehicle, the device comprising a lever, means for pivotally securing one end of the lever to a portion of the vehicle body, a spring for the opposite end of the lever, means for securing one end of the spring to the free end of the lever and the opposite end of the spring to a second portion of the body with the normal position of the lever substantially horizontal, means for rotatably securing the wheel to the lever intermediate the ends thereof, and a second spring disposed intermediate the lever and a third portion of the body, one end of the second spring being adjacent the wheel securing means and the center line of the second spring in the normal horizontal position of the lever being substantially perpendicular to the center line thereof.

GASTON CHAUSSON.

REFERENCES CITED

The following references are of record in the file of this patent:

UNITED STATES PATENTS

| Number | Name | Date |
|---|---|---|
| 1,137,375 | Bair | Apr. 27, 1915 |
| 1,261,099 | Boswell | Apr. 2, 1918 |
| 2,013,566 | Lumbers | Sept. 3, 1935 |

FOREIGN PATENTS

| Number | Country | Date |
|---|---|---|
| 21,442 | Great Britain | 1912 |
| 139,093 | Great Britain | Feb. 26, 1920 |
| 364,387 | France | Mar. 19, 1906 |
| 418,685 | France | Oct. 6, 1910 |